(12) United States Patent
Cui et al.

(10) Patent No.: US 10,455,596 B2
(45) Date of Patent: Oct. 22, 2019

(54) COMMUNICATION APPARATUS, COMMUNICATION SYSTEM AND COMMUNICATION METHOD

(71) Applicant: SONY CORPORATION, Tokyo (JP)

(72) Inventors: Qimei Cui, Beijing (CN); Liang Zeng, Beijing (CN); Jiang Han, Beijing (CN); Yingni Zhang, Beijing (CN); Ningyu Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 117 days.

(21) Appl. No.: 14/782,656

(22) PCT Filed: Apr. 25, 2014

(86) PCT No.: PCT/CN2014/076219
§ 371 (c)(1),
(2) Date: Oct. 6, 2015

(87) PCT Pub. No.: WO2014/177020
PCT Pub. Date: Nov. 6, 2014

(65) Prior Publication Data
US 2016/0073421 A1    Mar. 10, 2016

(30) Foreign Application Priority Data

May 3, 2013   (CN) .......................... 2013 1 0160609

(51) Int. Cl.
*H04W 72/12*   (2009.01)
*H04W 72/00*   (2009.01)
(Continued)

(52) U.S. Cl.
CPC ............. *H04W 72/12* (2013.01); *H04L 5/001* (2013.01); *H04L 5/0057* (2013.01); *H04L 5/06* (2013.01);
(Continued)

(58) Field of Classification Search
CPC ............. H04W 72/12; H04W 72/1289; H04W 72/0406; H04W 72/0446; H04W 72/00;
(Continued)

(56) References Cited

U.S. PATENT DOCUMENTS 8,724,571 B2 * 5/2014 Chung .................. H04L 1/1893
370/329
9,794,814 B2 * 10/2017 Kim ..................... H04B 7/0413
(Continued)

FOREIGN PATENT DOCUMENTS

CN          101742672 A       6/2010
CN          101958775 A       1/2011
(Continued)

OTHER PUBLICATIONS

International Search Report dated Jul. 14, 2014 in PCT/CN14/076219 Filed Apr. 25, 2014.
(Continued)

*Primary Examiner* — Hashim S Bhatti
(74) *Attorney, Agent, or Firm* — Xsensus LLP

(57) ABSTRACT

A communication apparatus, communication system and communication method. The related communication apparatus is used for aggregating, at a base station side, communication resources at different frequencies and/or different transmission time, wherein a scheduling resource among the aggregated communication resources is used for transmitting control information about the scheduling resource and scheduled resources. The communication apparatus includes: a grouping unit configured to divide the communication resources into groups based on characteristics of the communication resources, wherein the same group of the communication resource is indicated by the same piece of control information; and a sending unit configured to send the control information to a corresponding communication
(Continued)

terminal side by the scheduling resource. The communication apparatus, communication system and communication method improve communication performance.

20 Claims, 11 Drawing Sheets

(51) Int. Cl.
H04L 5/00 (2006.01)
H04L 5/06 (2006.01)
H04W 72/04 (2009.01)
H04W 88/08 (2009.01)

(52) U.S. Cl.
CPC ....... *H04W 72/00* (2013.01); *H04W 72/0406* (2013.01); *H04W 72/0446* (2013.01); *H04W 72/1289* (2013.01); *H04W 88/08* (2013.01)

(58) Field of Classification Search
CPC ...... H04W 88/08; H04L 5/001; H04L 5/0057; H04L 5/06
See application file for complete search history.

(56) References Cited

U.S. PATENT DOCUMENTS

| | | | | |
|---|---|---|---|---|
| 2010/0118746 | A1* | 5/2010 | Gerlach | H04L 5/001 370/281 |
| 2012/0020308 | A1* | 1/2012 | Li | H04L 5/0007 370/329 |
| 2012/0134275 | A1* | 5/2012 | Choi | H04L 5/0057 370/241 |
| 2012/0307778 | A1* | 12/2012 | Nishio | H04L 1/0047 370/329 |
| 2013/0039197 | A1* | 2/2013 | Pan | H04L 1/0026 370/252 |
| 2014/0036849 | A1* | 2/2014 | Ribeiro | H04W 72/042 370/329 |
| 2014/0072022 | A1* | 3/2014 | Medles | H04B 7/0417 375/227 |
| 2014/0098779 | A1* | 4/2014 | Kim | H04B 7/024 370/329 |
| 2014/0105191 | A1* | 4/2014 | Yang | H04L 1/1867 370/336 |
| 2014/0146775 | A1* | 5/2014 | Guan | H04L 5/0051 370/329 |
| 2014/0146907 | A1* | 5/2014 | Kim | H04B 7/0413 375/267 |
| 2014/0169316 | A1* | 6/2014 | Kim | H04L 5/0048 370/329 |
| 2015/0023194 | A1* | 1/2015 | Seo | H04W 24/10 370/252 |
| 2015/0110032 | A1* | 4/2015 | Nagata | H04B 7/024 370/329 |
| 2015/0319754 | A1* | 11/2015 | Ishida | H04L 5/001 370/329 |
| 2016/0353456 | A1* | 12/2016 | Gilson | H04W 72/085 |

FOREIGN PATENT DOCUMENTS

| | | |
|---|---|---|
| CN | 102036347 A | 4/2011 |
| CN | 102075998 A | 5/2011 |
| CN | 102195742 A | 9/2011 |
| CN | 102804670 A | 11/2012 |
| EP | 2 424 138 A2 | 2/2012 |

OTHER PUBLICATIONS

Chinese Office Action dated Mar. 2, 2018 in Chinese Patent Application No. 201310160609.0, filed May 3, 2013 (w/ English translation of Categories of Cited Documents) 9 pp.

* cited by examiner

COMMUNICATION APPARATUS, COMMUNICATION SYSTEM AND COMMUNICATION METHOD

FIELD OF THE INVENTION

The present disclosure relates to the field of communication technologies, particularly to a communication apparatus, communication system and communication method and more particularly to a communication apparatus, communication system and communication method for aggregating communication resources at different frequencies and/or different transmission time.

BACKGROUND OF THE INVENTION

The Long Term Evolution (LTE) of the Universal Mobile Telecommunication System (UMTS) technology has been a major new technology research and development item initiated by the 3rd Generation Partnership Project (3GPP) in recent years. This technology can be regarded as a "quasi-4G technology". The LTE-Advanced (LTE-A) has been subsequent evolvement of the LTE. The 3GPP finalized the technical demand report of the LTE-A in 2008 and proposed the lowest demands of the LTE-A: a downlink peak rate of 1 Gbps and an uplink peak rate of 500 Mbps with spectrum utilization ratios of 15 Mbps/Hz and 30 Mbps/Hz respectively at the uplink and downlink peaks. In order to satisfy the various demand indexes of the 4G technology, the 3GPP has proposed several crucial technologies for the LTE-A, including, for example, carrier aggregation, coordinated multi-point transmission and reception, multi-antenna enhancement, etc.

The existing LTE system has approximated to the Shannon limit in terms of its frequency band utilization ratio. The throughput of the system has to be improved by improving the bandwidth or the signal to noise ratio of the system. In order to satisfy the peak rate requirement, the LTE-A currently supports a bandwidth of 100 MHz, but it may be difficult to locate such a large bandwidth among existing available spectrum resources and such large bandwidth brings great difficulty to the hardware design of a base station and a terminal. An economic and effective solution is Carrier Aggregation (CA), where for example at most 5 idle carriers are allocated to a User Equipment (UE) for availability of a larger transmission bandwidth. For example, 5 carriers with a bandwidth of 20 MHz can be aggregated into 100 MHz to serve a UE collectively.

At present the Evolved Universal Terrestrial Radio Access (E-UTRA) system supports 6 channel bandwidths: 1.4 MHz, 3 MHz, 5 MHz, 10 MHz, 15 MHz and 20 MHz.

Downlink Control Information (DCI) including control information about resource allocation and other aspects of one or more User Equipments (UEs) is carried over a Physical Downlink Control Channel (PDCCH) of a carrier. In the LTE, both unlink and downlink resource scheduling information is carried over a PDCCH. In general, a plurality of PDCCHs may be present in a sub-frame. The user has to firstly demodulate the DCI over the PDCCH and then demodulate its own Physical Downlink Shared Channel (PDSCH) (including a broadcast message, paging, data of the UE, etc.) at a corresponding resource position.

In a heterogeneous network scenario with carrier aggregation, for example, resources are typically scheduled through cross-carrier scheduling to lower interference. In cross-carrier scheduling, a UE needs to parse a PDCCH over only one scheduling carrier, e.g., a primary carrier, and the UE also needs to parse the PDCCH for information about resource allocation over a scheduled carrier, e.g., a secondary carrier. Thus in cross-carrier scheduling, DCI information carried in the PDCCH of the scheduling carrier may be more complex (including both the DCI of the scheduling carrier and DCI of all the scheduled carriers). In view of this, a Carrier Indicator Field (CIF) may be further added to a DCI format to indicate the number of a scheduled carrier corresponding to the CIF. At present a CIF in the 3GPP standard is information at a fixed length of 3 bits. In the case that 5 component carriers are allocated to a UE for transmission, if a PDCCH of one scheduling carrier carries control information about all the other 4 carriers, then 5 pieces of DCI and corresponding CIF fields have to be involved. Apparently in the case of cross-carrier scheduling, the UE has to detect blindly in a search space with an increase in complexity, and a larger control channel resource may be required to satisfy the demand.

SUMMARY OF THE INVENTION

With a communication apparatus, communication system and method according to the present disclosure, communication performance can be improved, and for example, one or more of the following advantages can be achieved: saving of a physical control channel resource, a lowered number of searches with blind decoding, lowered complexity of a UE, improved communication efficiency and saving of power utilization efficiency in communication.

There is provided a communication apparatus according to an embodiment of the present disclosure for aggregating, at a base station side, communication resources at different frequencies and/or different transmission time, wherein a scheduling resource among the aggregated communication resources is used for transmitting control information about the scheming resources and scheduled resources. The communication apparatus includes: a grouping unit configured to divide the communication resources into groups based on characteristics of the communication resources, wherein the same group of communication resources is indicated by the same piece of control information; and a sending unit configured to send the control information to a corresponding communication terminal side over the scheduling resource.

There is provided a communication apparatus according to an embodiment of the present disclosure for aggregating, at a communication terminal side, communication resources at different frequencies and/or different transmission time, wherein a scheduling resource among the aggregated communication resources is used for transmitting control information about the scheduling resource and scheduled resources. The communication apparatus includes: a resource characteristic sending unit configured to provide characteristics of the communication resources to a base station side; and a control information receiving unit configured to receive the control information over the scheduling resource and to process the communication resources based on the control information, wherein the communication resources are divided into groups based on the characteristics of the communication resources, and the same group of communication resources is indicated by the same piece of control information.

There is provided a communication system according to an embodiment of the present disclosure for aggregating communication resources at different frequencies and/or different transmission time, wherein a scheduling resource among the aggregated communication resources is used for transmitting control information about the scheduling resource and scheduled resources. The communication system includes a communication terminal and a base station. The base station includes: a grouping unit configured to divide the communication resources into groups based on characteristics of the communication resources, wherein the same group of communication resources is indicated by the same piece of control information; and a sending unit configured to send the control information to the communication terminal over the scheduling resource. The communication terminal includes: a resource characteristic sending unit configured to provide the characteristics of the communication resources to the base station; and a control information receiving unit configured to receive the control information over the scheduling resource and to process the communication resources based on the control information.

There is provided a communication method according to an embodiment of the present disclosure for aggregating communication resources at different frequencies and/or different transmission time, wherein a scheduling resource among the aggregated communication resources is used for transmitting control information about the scheduling resource and scheduled resources. The communication method includes: sending, at a communication terminal side, characteristics of the communication resources to a base station side, and dividing, at the base station side, the communication resources into groups based on the characteristics of the communication resources, wherein the same group of communication resources is indicated by the same piece of control information; and sending, at the base station side, the control information to the communication terminal side over the scheduling resource; and receiving, at the communication terminal side, the control information over the scheduling resource, and processing, at the communication terminal side, the communication resources based on the control information.

With the communication apparatus, communication system and method according to the embodiments of the present disclosure, communication performance can be improved because it is very likely for DCI of different scheduled carriers to be the same or similar, for example, in a carrier scheduling scenario, to thereby group the scheduled carriers for the purpose of improved communication performance.

BRIEF DESCRIPTION OF THE DRAWINGS

The foregoing and other objects, features and advantages of the invention will become apparent from the following description detailing preferred embodiments of the gist and use of the invention as well as the drawings in which.

DETAILED DESCRIPTION OF THE INVENTION

Embodiments of the invention will be described below in details with reference to the drawings.

The description will be given below in the following order.

1. A first embodiment of the present disclosure (applicable to communication resources at different frequencies)

2. A second embodiment of the present disclosure (applicable to communication resources at different transmission time)

3. A third embodiment of the present disclosure (applicable to communication resources at both different frequencies and transmission time)

4. A fourth embodiment of the present disclosure (hardware configuration for implementing an improvement of the embodiments of the present disclosure)

1. A First Embodiment of the Present Disclosure (Applicable to Communication Resources at Different Frequencies)

A communication apparatus according to the first embodiment of the present disclosure will be described below with reference to FIG. 1 to FIG. 4. In this embodiment, an aggregating object is carriers at different frequencies. In this embodiment, a conventional carrier operates as a scheduling carrier to schedule an NCT. Typically the scheduling carrier is a primary carrier, but those ordinarily skilled in the art shall appreciate that the scheduling carrier can alternatively be a secondary carrier, and correspondingly a scheduled carrier can alternatively be a secondary carrier.

In this embodiment, a legacy carrier operates as a scheduling carrier to schedule a New Carrier Type (NCT). Those ordinarily skilled in the art shall further appreciate that a scheduled carrier can alternatively be a conventional carrier instead of an NCT. The NCT will be introduced briefly below.

In order to improve the spectrum efficiency and schedule an idle frequency band flexibly, the 3GPP proposes the NCT. The NCT itself does not involve a Physical Broadcast Channel (PBCH), a PDCCH, etc., so control on the NCT is open-loop control. A base station can control the NCT more flexibly depending upon a practical condition.

Figure 1:
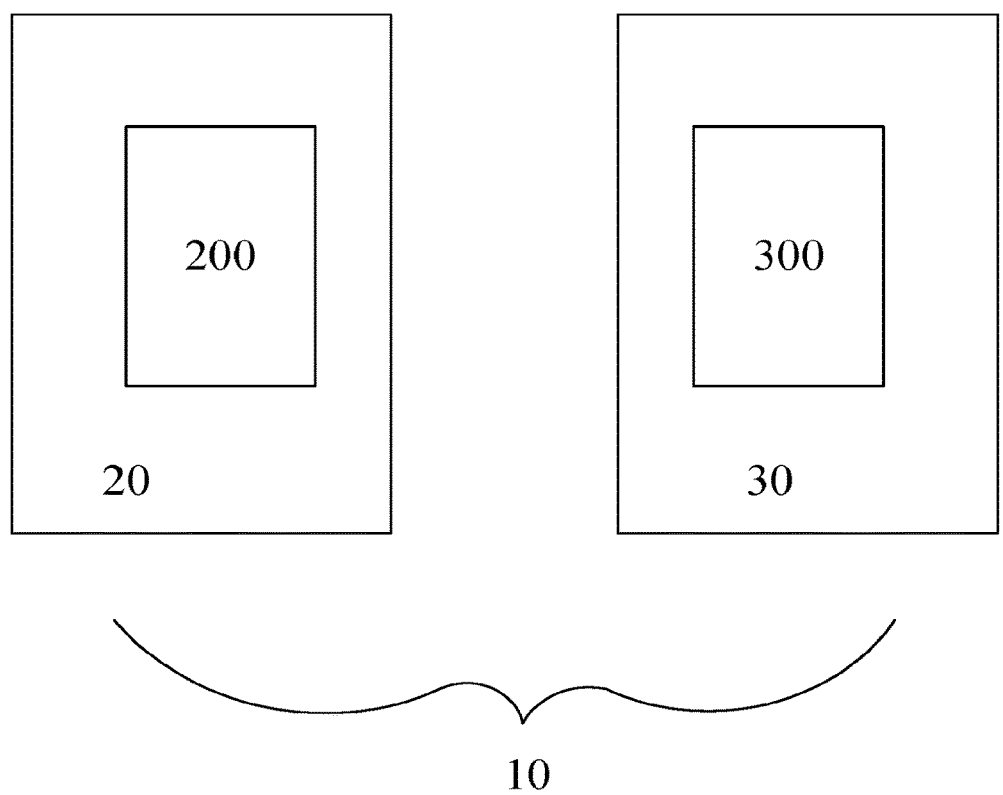
FIG. 1 is a block diagram illustrating a configuration example of a communication system according to a first embodiment of the present disclosure.

Firstly FIG. 1 illustrates a communication system 10 according to the first embodiment of the present disclosure. The communication system 10 includes a base station 20 and a user equipment 30, where the base station 20 includes a communication apparatus 200 at the base station 20 side, and the user equipment 30 includes a communication apparatus 300 at the user equipment 30 side.

Figure 2:
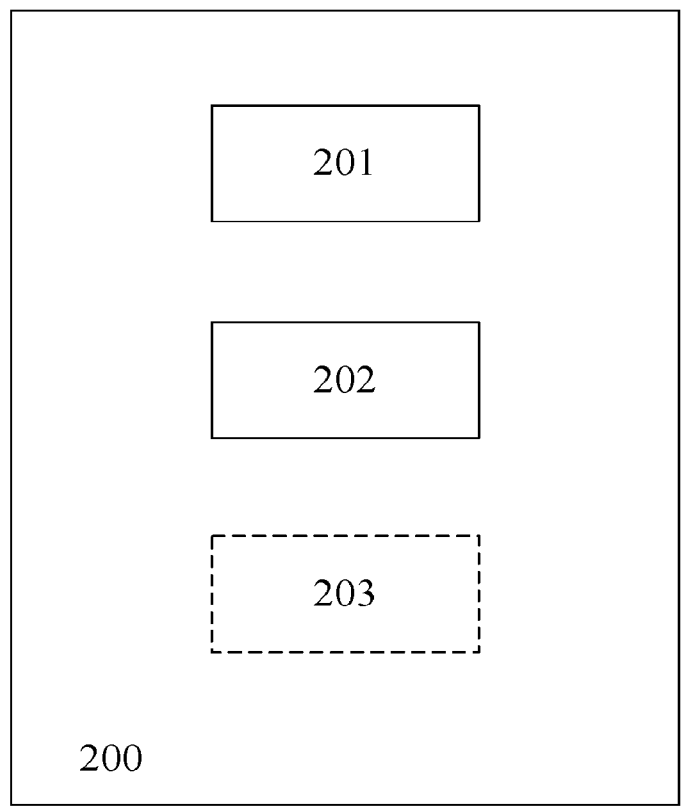
FIG. 2 is a block diagram illustrating a configuration example of a communication apparatus at the base station side in the communication system according to the first embodiment of the present disclosure.

FIG. 2 is a block diagram illustrating a configuration example of the communication apparatus 200. The communication apparatus 200 includes a grouping unit 201, a sending unit 202 and an optional carrier indication scheme selecting unit 203.

Figure 3:
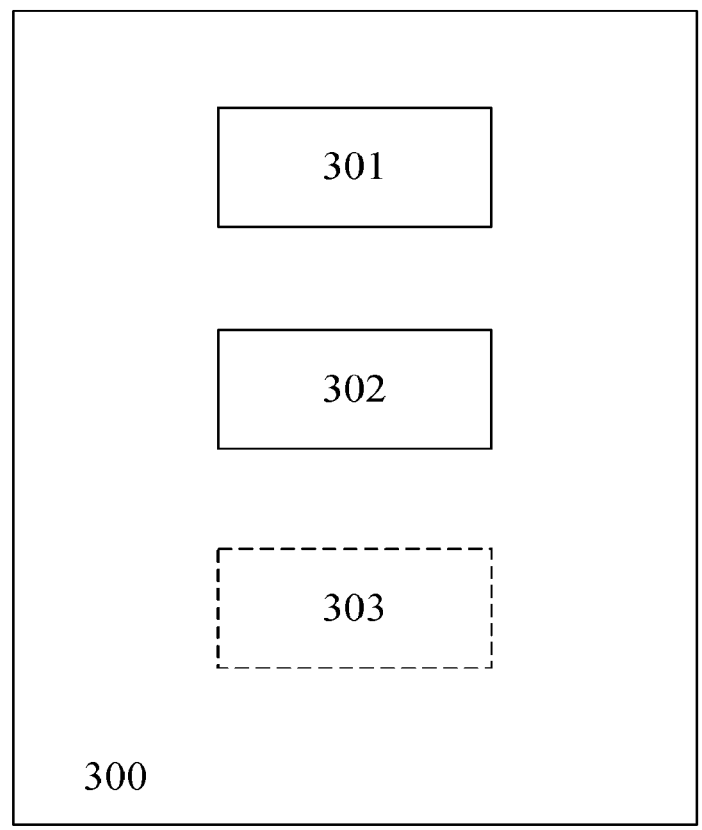
FIG. 3 is a block diagram illustrating a configuration example of a communication apparatus at the user equipment side in the communication system according to the first embodiment of the present disclosure.

FIG. 3 is a block diagram illustrating a configuration example of the communication apparatus 300. The communication apparatus 300 includes a resource characteristic sending unit 301, a control information receiving unit 302 and an optional carrier indication scheme determining unit 303.

The communication apparatuses 200 and 300 and their respective functional units will be described below in connection with an example of a communication method according to the first embodiment of the present disclosure illustrated in FIG. 4.

Firstly those ordinarily skilled in the art shall appreciate that in Carrier Aggregation (CA), the base station 20 typically needs to determine whether CA can be enabled for the user equipment 30 based upon CA capabilities of respective carriers reported by the user equipment 30 (the user equipment 30 here can be a single communication terminal or can be a set of communication terminals with a similar characteristic). For the user equipment 30 for which CA can be enabled, those carriers for which CA is enabled can be further determined, that is, carriers to be aggregated are determined. Thereafter the user equipment 30 can be notified of the determined carriers to be aggregated. Alternatively the user equipment 30 can be only notified of a need for CA when all the carriers of the user equipment 30 are determined for CA. For example, a carrier aggregation condition can be sent to the user equipment 30 side in Radio Resource Control (RRC) signaling. Of course, those ordinarily skilled in the art shall appreciate that the carriers to be aggregated can be determined otherwise as in the prior art.

The steps of determining carriers to be aggregated and notifying the user equipment 30 of carriers to be aggregated are similar to corresponding steps in exiting CA-based cross-carrier scheduling, so a repeated description thereof will be omitted here.

Figure 4:
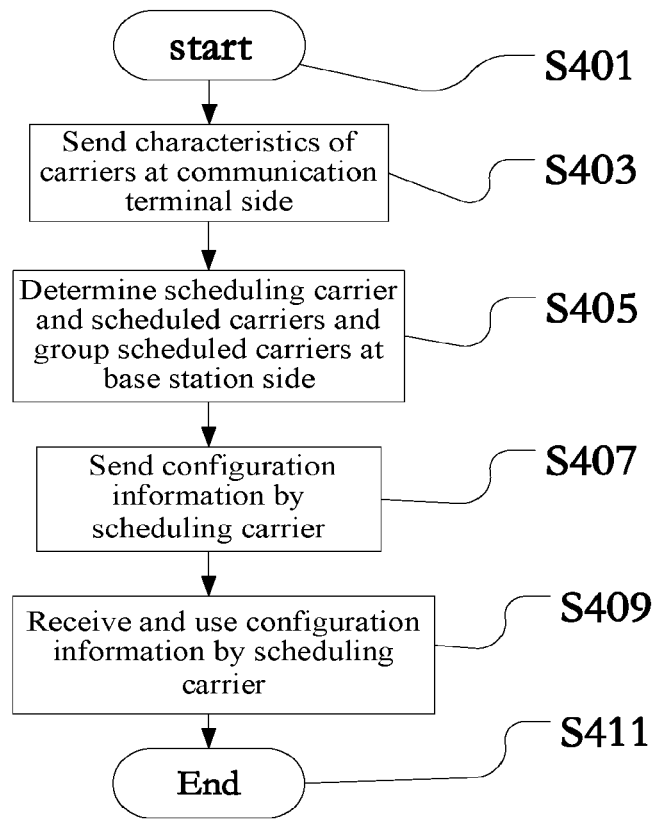
FIG. 4 is a schematic diagram illustrating a communication method according to the first embodiment of the present disclosure.

The communication method according to the first embodiment of the present disclosure starts at the step S401 illustrated in FIG. 4 and proceeds to the step S403.

At the step S403 illustrated in FIG. 4, at the user equipment 30 side, characteristics of carriers to be aggregated are provided to the base station 20 side based upon the carriers to be aggregated determined at the base station 20 side as described above, and this step can be performed by the resource characteristic sending unit 301, for example.

It is assumed here that the carriers for which CA is to be enabled for the user equipment 30 are CC1, CC2, CC3, CC4 and CC5. The user equipment 30 sends characteristics of CC1, CC2, CC3, CC4 and CC5 to the base station 20. The characteristic can be a channel condition, provided over a corresponding carrier, between the base station 20 (or another base station) and the user equipment 30. For example, the channel condition can include at least one of a channel quality and a channel bandwidth. For example, communication qualities over the carriers CC1, CC2, CC3, CC4 and CC5 between the base station 20 (or the other base station) and the user equipment 30 are indicated by Channel Quality Indicators (CQIs).

Those ordinarily skilled in the art shall appreciate that at the base station 20 side, a scheduling carrier and a scheduled carrier are determined among the carriers CC1, CC2, CC3, CC4 and CC5 to be aggregated. For example, at the base station 20 side, CC1 is determined as a scheduling carrier, and CC2, CC3, CC4 and CC5 are determined as scheduled carriers, based upon the characteristics (e.g., the CQIs) of the carriers CC1, CC2, CC3, CC4 and CC5 from the user equipment 30. Those ordinarily skilled in the art shall appreciate that the base station 20 can alternatively determine a scheduling carrier and scheduled carriers based upon another rule. Thus when a scheduling carrier and scheduled carriers are not determined based upon the characteristics of the carriers from the user equipment 30, a process of determining a scheduling carrier and scheduled carriers may not necessarily be performed following the process in which the user equipment 30 sends the characteristics of the carriers, in other words, the two processes can be performed in an appropriately altered order or concurrently.

At the step S405 illustrated in FIG. 4, at the base station 20 side, the carriers CC1, CC2, CC3, CC4 and CC5 to be grouped are grouped based upon the characteristics (e.g., the CQIs) of the carriers CC1, CC2, CC3, CC4 and CC5 to be grouped, where the same group of carriers can be indicated by the same piece of control information (e.g., DCI). This process can be performed by the grouping unit 201, for example.

As an example of a grouping rule, the carriers can be grouped by the values of their CQIs, and each group corresponds to the same modulation scheme which can be indicated by control information corresponding to the group. Typically a CQI with a high value represents a high communication quality of a channel or a carrier carrying the channel, and vice versa. Particularly, the carriers with the values of the CQIs being 1 to 6 can be attributed to one group corresponding to a modulation scheme of Quadrature Phase-Shift Keying (QPSK); the carriers with the values of the CQIs being 7 to 9 can be attributed to one group corresponding to a modulation scheme of 16-Quadrature Amplitude Modulation (16QAM); and the carriers with the values of the CQIs being 10 to 15 can be attributed to one group corresponding to a modulation scheme of 64QAM.

As another example of a grouping rule, the carriers can be grouped by their frequency band ranges in use. For example, in the case that the carriers to be aggregated are three carriers CC1, CC2 and CC3, if the carriers CC1 and CC2 are located in one frequency band (frequency ranges of the two carriers may or may not be adjacent), and the carrier C3 is located in another frequency band, then the carriers CC1 and CC2 can be attributed to one group while attributing the carrier CC3 alone to one group.

Those ordinarily skilled in the art can further appreciate that the carriers to be aggregated can be otherwise grouped appropriately.

Referring back to the case that the carriers to be aggregated are five carriers CC1, CC2, CC3, CC4 and CC5. In the case that CC1, CC2, CC3, CC4 and CC5 are attributed to one group, control information about these five carriers can be sent to the user equipment 30 in the same piece of DCI. In the case that CC1, CC2, CC3, CC4 and CC5 are attributed to more than one group, for example, in the case that CC1, CC2 and CC3 are attributed to one group and CC4 and CC5 are attributed to one group, control information about CC1, CC2 and CC3 can be sent in one piece of DCI, and control information about CC4 and CC5 can be sent in another piece of DCI.

At the step S407 illustrated in FIG. 4, at the base station 20 side, the control information, i.e., the DCI described above, is sent to the user equipment 30 side over the scheduling carrier CC1. This step can be performed by the sending unit 202, for example.

In order to indicate that the DCI is related to the carriers CC1, CC2, CC3, CC4 and CC5, an enhanced Carrier Indicator Field (eCIF) in the DCI is used as an optional scheme. The eCIF can indicate a plurality of carriers, that is, include all the possible combinations of the carriers. For example, each bit in the eCIF can represent a carrier by 1 representing being related to the carrier and 0 representing being unrelated to the carrier. Bits in a descending order correspond to carrier numbers in a descending order. By way of an example with 5 carriers, a particular correspondence scheme can be as depicted in Table 1 below.

TABLE 1

| eCIF | Indicated carrier number(s) |
|---|---|
| eCIF indicates only 1 carrier | |
| 00001 | 1 |
| 00010 | 2 |
| 00100 | 3 |
| 01000 | 4 |
| 10000 | 5 |
| eCIF indicates 2 carriers | |
| 00011 | 1, 2 |
| 00101 | 1, 3 |
| 01001 | 1, 4 |
| 10001 | 1, 5 |
| 00110 | 2, 3 |
| 01010 | 2, 4 |
| 10010 | 2, 5 |
| 01100 | 3, 4 |
| 10100 | 3, 5 |
| 11000 | 4, 5 |
| eCIF indicates 3 carriers | |
| 00111 | 1, 2, 3 |
| 01011 | 1, 2, 4 |
| 10011 | 1, 2, 5 |
| 01101 | 1, 3, 4 |
| 10101 | 1, 3, 5 |
| 11001 | 1, 4, 5 |
| 01110 | 2, 3, 4 |
| 10110 | 2, 3, 5 |
| 11010 | 2, 4, 5 |
| 11100 | 3, 4, 5 |
| eCIF indicates 4 carriers | |
| 01111 | 1, 2, 3, 4 |
| 10111 | 1, 2, 3, 5 |
| 11011 | 1, 2, 4, 5 |
| 11101 | 1, 3, 4, 5 |
| 11110 | 2, 3, 4, 5 |
| eCIF indicates 5 carriers | |
| 11111 | 1, 2, 3, 4, 5 |

Of course the eCIF can be otherwise defined appropriately so long as the eCIF can indicate a correspondence relationship between a DCI and a carrier(s) it relates to. For example, when there are 3 carriers CC1, CC2 and CC3 to be aggregated, a 3-bit eCIF can be used as depicted in Table 2 below to define a correspondence between the value of the eCIF and a carrier(s).

TABLE 2

| eCIF | indicated carrier number(s) |
|---|---|
| 000 | CC1, CC2, CC3 |
| 001 | CC1 |
| 010 | CC2 |
| 011 | CC3 |
| 100 | CC1, CC2 |
| 101 | CC1, CC3 |
| 110 | CC2, CC3 |
| 111 | N/A |

Moreover since the existing CIF includes 3 bits only indicating to which carrier the DCI corresponds (that is, one piece of DIC corresponds to only one carrier), while the 3 bits can take 8 different values, a redundant codeword may be present with the number of carriers below 8 (the largest numbers of carriers is specified in the existing standard as 5). Such a redundant codeword can indicate whether DCI is related to the grouped scheduled carriers (that is, whether the DCI is related to only one or more scheduled carriers) or to which scheduled carrier(s) the DCI is related. The existing CIF can be used as such for better compatibility with a device supporting the existing CIF.

For example, with CA involving only 3 carriers (the user equipment 30 can know from RRC signaling how many carriers are involved with CA), 5 redundant codewords will be present. Four of these 5 redundant codewords can represent "related to the $1^{st}$ and $2^{nd}$ carriers", "related to the $1^{st}$ and $3^{rd}$ carriers", "related to the $2^{nd}$ and $3^{rd}$ carriers" and "related to the $1^{st}$, $2^{nd}$ and $3^{rd}$ carriers" respectively.

The carrier indication scheme selecting unit 203 can select a scheme to indicate a correspondence relationship between the control information and the scheduled carriers (for example, in an existing CIF, in an eCIF or in a redundant codeword in a CIF). However the carrier indication scheme selecting unit 203 may not be arranged, but the same carrier indication scheme can be prescribed for use at the base station 20 side and the user equipment 30 side in a prearranged manner.

Moreover the carrier indication scheme selecting unit 203 can select a carrier indication scheme according to a resource indication scheme used at the user equipment 30 side or can select a carrier indication scheme dependent upon a scenario with ongoing communication or can select a carrier indication scheme based upon another criterion.

The user equipment 30 side can be notified of the selected carrier indication scheme in RRC signaling, for example.

At the step S409 illustrated in FIG. 4, at the user equipment 30 side, the control information is received over the scheduling carrier CC1, and the carriers CC1, CC2, CC3, CC4 and CC5 are processed based upon the control information. This process can be performed by the control information receiving unit 302, for example.

The carrier indication scheme determining unit 303 can determine a scheme to indicate a correspondence relationship between the control information and the scheduled carriers in the control information. For example, the correspondence relationship between the DCI and the scheduled carriers can be determined to be indicated in an existing CIF, an eCIF or in a redundant codeword in a CIF. However the carrier indication scheme determining unit 303 may not be arranged, but the scheme to indicate a correspondence relationship between the control information and the scheduled carriers in the control information can be determined as a prearranged scheme.

Moreover the carrier indication scheme can be determined based on a notification from the base station 20 side, or the carrier indication scheme can be determined dependent upon a scenario with ongoing communication, or the carrier indication scheme can be determined based upon another criterion.

After determining to which scheduled carrier(s) the control information is related, the corresponding scheduled carrier(s) can be processed based upon the control information Thereafter the flow ends at the step S411 illustrated in FIG. 4.

It shall be noted that the base station 20 including the communication apparatus 200 according to the first embodiment of the present disclosure may not necessarily operate with the user equipment 30 including the communication apparatus 300 according to the first embodiment of the present disclosure. On the contrary, the base station 20 including the communication apparatus 200 according to the first embodiment of the present disclosure can operate with any user equipment configured otherwise so long as the user equipment can send characteristics of carriers to the communication apparatus 200 and can receive and use control information sent over a scheduling carrier from the communication apparatus 200.

Similarly the user equipment 30 including the communication apparatus 300 according to the first embodiment of the present disclosure may not necessarily operate with the base station 20 including the communication apparatus 200 according to the first embodiment of the present disclosure. On the contrary, the user equipment 30 including the communication apparatus 300 according to the first embodiment of the present disclosure can operate with any base station configured otherwise so long as the base station can send over a scheduling carrier, to the user equipment 30, control information that can be used by the communication apparatus 300.

With the communication apparatus, communication system and method according to the first embodiment of the present disclosure, communication performance can be improved, and for example, one or more of the following advantages can be achieved: saving of a physical control channel resource, a lowered number of searches with blind decoding, lowered complexity of a UE, improved communication efficiency and saving of energy utilization efficiency in communication. For an NCT carrier over which no resource can be scheduled separately, the advantages of the invention will be more prominent.

2. A Second Embodiment of the Present Disclosure
(Applicable to Communication Resources at Different Transmission Time)

Although aggregation and scheduling of carriers has been described above, sub-frames can also be aggregated and scheduled in the time domain in the field of communication. Particularly a scheduling sub-frame sent from the base station side carries control information related to respective sub-frames, and the user equipment side receives the control information in the scheduling sub-frame and processes the respective sub-frames based upon the control information.

Figure 11:
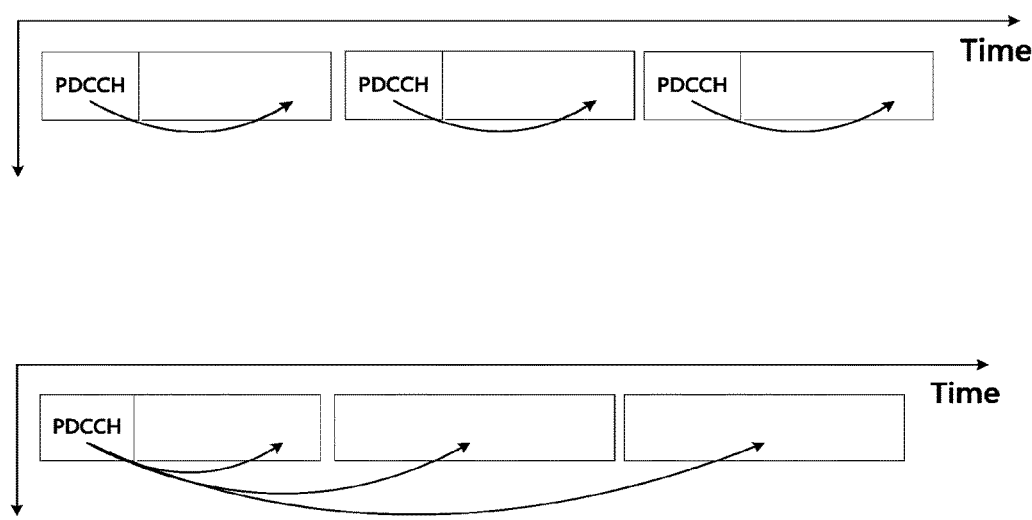
FIG. 11 is a schematic diagram of cross-time scheduling.

As a more particular example, as illustrated in FIG. 11, three downlink sub-frames originally having PDCCHs respectively (the upper half of FIG. 11) can be sent as follows: there is a PDCCH only in the first sub-frame, and DIC about all the three sub-frames is carried over the PDCCH (the lower half of FIG. 11). Upon reception of these three sub-frames at the user equipment side, the user equipment side obtains the information about the respective sub-frames based upon the DCI in the PDCCH of the first sub-frame and thereby processes the respective sub-frames separately. Of course, the situation in FIG. 11 is merely exemplary, and sub-frames can be otherwise aggregated and scheduled appropriately in the time domain.

Moreover in a communication system with time division duplex, the following situation may also be present: an uplink sub-frame sent from a user equipment needs to be scheduled by control information, e.g., DCI, included in a downlink sub-frame sent from base station. Typically one downlink sub-frame schedules one uplink sub-frame, and in the case that one downlink sub-frame schedules a plurality of uplink sub-frames, this can be regarded as an example of aggregation of sub-frames as referred to in the invention.

The second embodiment of the present discourse will be described below for a scenario in which sub-frames are aggregated and scheduled in the time domain.

A communication apparatus according to the second embodiment of the present disclosure will be described below with reference to FIG. 5 to FIG. 8. In this embodiment, an aggregating object is sub-frames at different transmission time. In other words, aggregation and scheduling in the frequency domain according to the first embodiment is extended to aggregation and scheduling in the time domain.

Figure 5:
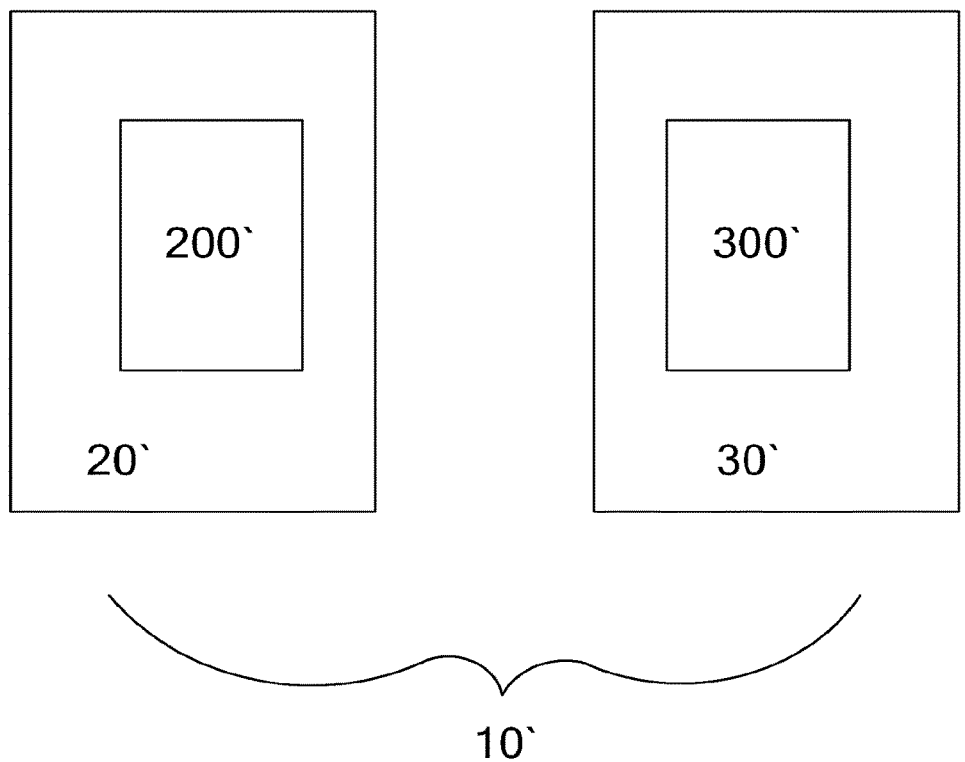
FIG. 5 is a block diagram illustrating a configuration example of a communication system according to a second embodiment of the present disclosure.

First, FIG. 5 illustrates a communication system 10' according to the second embodiment of the present disclosure. The communication system 10' includes a base station 20' and a user equipment 30', where the base station 20' includes a communication apparatus 200' at the base station 20' side, and the user equipment 30' includes a communication apparatus 300' at the user equipment 30' side. Here the communication system 10' according to the second embodiment of the present disclosure is configured substantially the same as the communication system 10 according to the first embodiment of the present disclosure, so a repeated description thereof will be omitted here.

Figure 6:
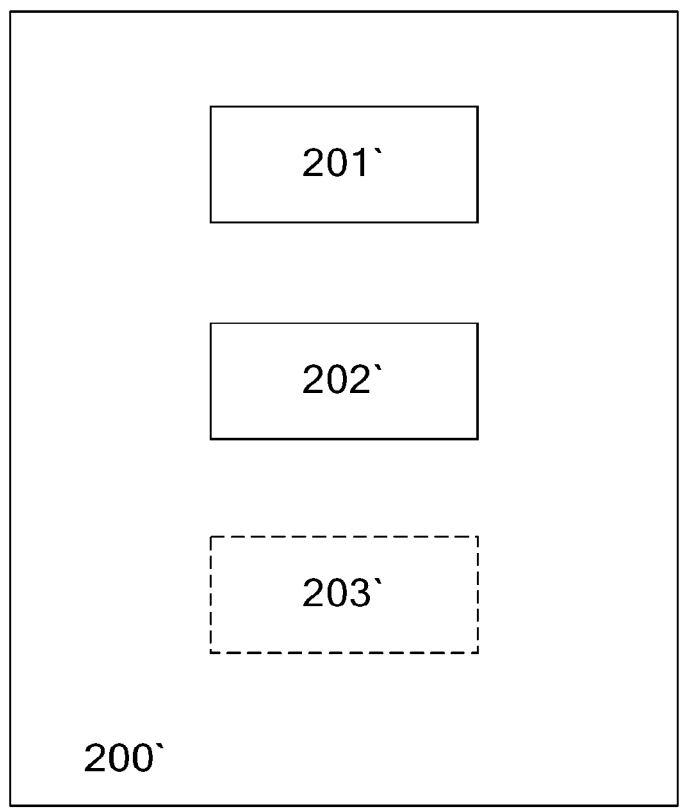
FIG. 6 is a block diagram illustrating a configuration example of a communication apparatus at the base station side in the communication system according to the second embodiment of the present disclosure.

FIG. 6 is a block diagram illustrating a configuration example of the communication apparatus 200'. The communication apparatus 200' includes a grouping unit 201', a sending unit 202' and an optional sub-frame indication scheme selecting unit 203'. Here except the optional sub-frame indication scheme selecting unit 203, the communication apparatus 200' according to the second embodiment of the present disclosure is configured substantially the same as the communication apparatus 200 according to the first embodiment of the present disclosure, so a repeated description thereof will be omitted here.

Figure 7:
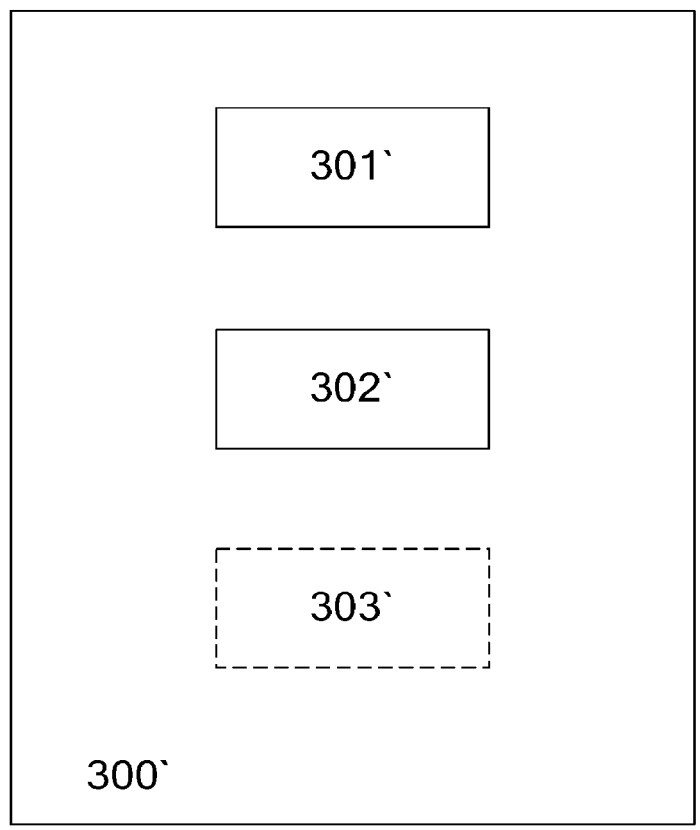
FIG. 7 is a block diagram illustrating a configuration example of a communication apparatus at the user equipment side in the communication system according to the second embodiment of the present disclosure.

FIG. 7 is a block diagram illustrating a configuration example of the communication apparatus 300'. The communication apparatus 300' includes a resource characteristic sending unit 301', a control information receiving unit 302' and an optional sub-frame indication scheme determining unit 303'. Here except the optional sub-frame indication scheme determining unit 303', the communication apparatus 300' according to the second embodiment of the present disclosure is configured substantially the same as the communication apparatus 300 according to the first embodiment of the present disclosure, so a repeated description thereof will be omitted here.

The communication apparatuses 200' and 300' and their respective functional units will be described below in connection with an example of a communication method according to the second embodiment of the present disclosure illustrated in FIG. 8.

Figure 8:
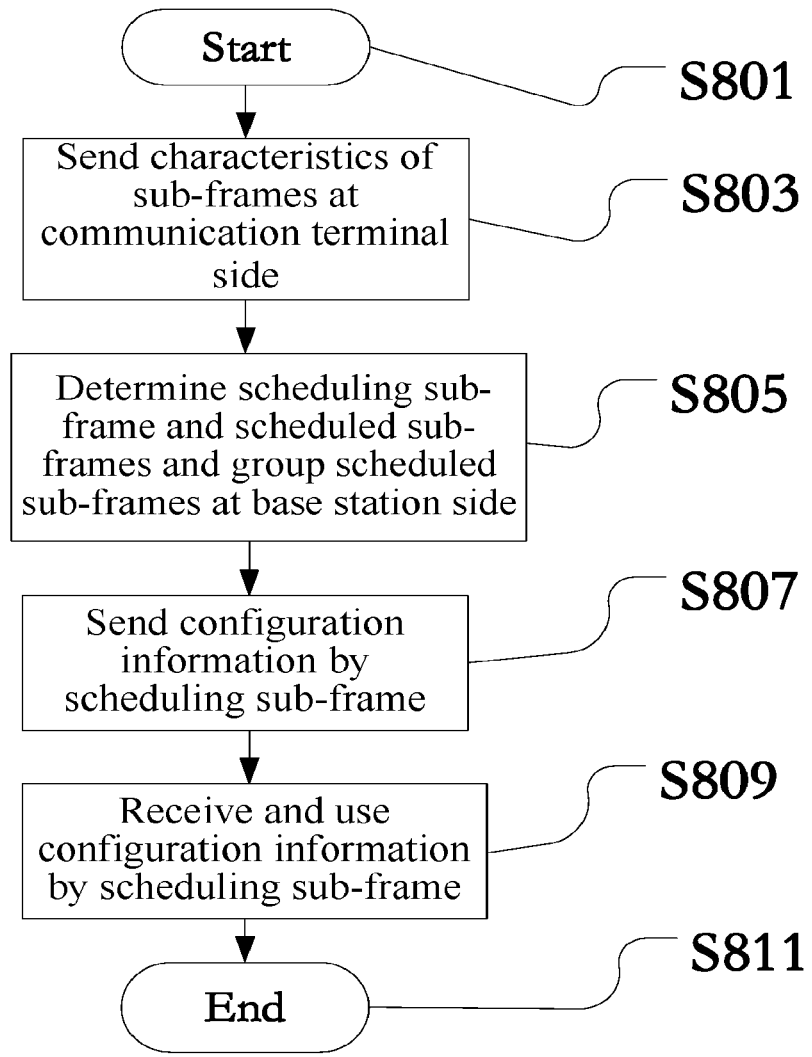
FIG. 8 is a schematic diagram illustrating a communication method according to the second embodiment of the present disclosure.

The flow illustrated in FIG. 8 starts at the step S801 and proceeds to the step S803.

At the step S803 illustrated in FIG. 8, at the user equipment 30' side, characteristics of sub-frames to be aggregated are provided to the base station 20' side based upon the sub-frames to be aggregated determined at the base station 20' side, and this step can be performed by the resource characteristic sending unit 301', for example.

Those ordinarily skilled in the art shall appreciate that at the base station 20' side, a scheduling sub-frame and scheduled sub-frames can be determined among the sub-frames to be aggregated. Thus when a scheduling sub-frame and scheduled sub-frames are not determined based upon the characteristics of the sub-frames from the user equipment 30', a process of determining a scheduling sub-frame and scheduled sub-frames may not necessarily be performed following the process in which the user equipment 30' sends the characteristics of the sub-frames, in other words, the two processes can be performed in an appropriately altered order or concurrently.

At the step S805 illustrated in FIG. 8, at the base station 20' side, the sub-frames to be aggregated are grouped based upon the characteristics of the sub-frames to be aggregated, where the same group of sub-frames can be indicated by the same piece of control information (e.g., DCI). This process can be performed by the grouping unit 201', for example.

As a criterion to group the sub-frames, the sub-frames can be grouped by their various appropriate characteristics. For example, the sub-frames can be grouped by CQIs, provided by respective sub-frames, between the base station 20' (or another base station) side and the corresponding user equipment 30' side. Here the CQIs of the sub-frames can be fed back to the base station 20' side at a predetermined periodicity or otherwise appropriately.

At the step S807 illustrated in FIG. 8, at the base station 20' side, the control information is sent to the user equipment 30' in the scheduling sub-frame. This step can be performed by the sending unit 202', for example.

In order to indicate to which one or more of the scheduled sub-frames the scheduling information is related, an enhanced sub-frame indicator field is used as an optional scheme. The enhanced sub-frame indicator field can indicate a plurality of sub-frames, that is, include all the possible combinations of the sub-frames. For example, each bit in the enhanced sub-frame indicator field can represent a sub-frame by 1 representing being related to the sub-frame and 0 representing being unrelated to the sub-frame. Bits in a descending order correspond to sub-frame numbers in a descending order. The length of the enhanced sub-frame indicator field can be predetermined, for example, 10 bits. In this case, 10 sub-frames in total can be aggregated.

A correspondence relationship between the values in the enhanced sub-frame indicator field and the different combinations of sub-frames are similar to the correspondence relationship in eCIF described above, so a repeated description thereof will be omitted here.

Of course the enhanced sub-frame indicator field can be otherwise defined appropriately. Moreover redundant codebits in a sub-frame indicator field with a fixed length can indicate a correspondence relationship between control information and a sub-frame(s) it relates to, for example, similarly to redundant codewords in an existing CIF as described above.

The sub-frame indication scheme selecting unit 203' can select a scheme to indicate a correspondence relationship between the control information and the scheduled sub-frames. However the sub-frame indication scheme selecting unit 203' may not be arranged, but the same sub-frame indication scheme can be used at the base station 20' side and the user equipment 30' side in a prearranged manner.

Moreover a sub-frame indication scheme can be selected according to a resource indication scheme, or a sub-frame indication scheme can be selected dependent upon a scenario with ongoing communication, or a sub-frame indication scheme can be selected based upon another criterion.

The user equipment 30' side can be notified of the selected sub-frame indication scheme in RRC signaling, for example.

At the step S809 illustrated in FIG. 8, at the user equipment 30' side, the control information is received over the scheduling sub-frame, and the sub-frames are processed based upon the control information. This process can be performed by the control information receiving unit 302', for example.

The sub-frame indication scheme determining unit 303' can determine a scheme to indicate a correspondence relationship between the control information and the scheduled sub-frames in the control information. However the sub-frame indication scheme determining unit 303' may not be arranged, but the scheme to indicate a correspondence relationship between the control information and the scheduled sub-frames in the control information can be determined in a prearranged manner.

Moreover the sub-frame indication scheme can be determined based on a notification from the base station 20' side, or the sub-frame indication scheme can be determined dependent upon a scenario with ongoing communication, or the sub-frame indication scheme can be determined based upon another criterion.

After determining to which scheduled sub-frame(s) the control information is related, the corresponding scheduled sub-frame(s) can be processed based upon what is indicated in the control information.

Thereafter the flow proceeds to the step S811 and ends

It shall be noted that similarly to the first embodiment, the base station 20' including the communication apparatus 200' according to the second embodiment of the present disclosure may not necessarily operate with the user equipment 30' including the communication apparatus 300' according to the embodiment of the present disclosure. The user equipment 30' including the communication apparatus 300' according to the second embodiment of the present disclosure may not necessarily operate with the base station 20' including the communication apparatus 200' according to the second embodiment of the present disclosure either.

With the communication apparatus, communication system and method according to the second embodiment of the present disclosure, communication performance can be improved, and for example, one or more of the following advantages can be achieved: saving of an extra overhead in transmission of sub-frames, improved communication efficiency and saving of energy utilization efficiency in communication.

3. A Third Embodiment of the Present Disclosure
(Applicable to Communication Resources at Both
Different Frequencies and Transmission Time)

A communication apparatus according to the third embodiment of the present discourse will be described below. In this embodiment, an aggregating object is sub-frames at both different transmission time and different frequencies for the carriers. In other words, aggregation and scheduling in the frequency domain according to the first embodiment is extended to aggregation and scheduling in the frequency and time domains.

For a communication apparatus, communication system and method according to the third embodiment of the present disclosure, reference can be made to FIG. 5 to FIG. 8 in which the communication apparatus, communication system and method according to the second embodiment of the present disclosure have been described.

An aggregation and scheduling object according to the third embodiment of the present disclosure is sub-frames as the aggregation and scheduling object according to the second embodiment of the present disclosure except the sub-frame to be aggregated and scheduled can be carried over carriers at different frequencies in the third embodiment of the present disclosure. Thus a main difference of the third embodiment of the present disclosure from the second embodiment of the present disclosure lies in how to indicate a correspondence relationship between control information and sub-frames, at both different frequencies and transmission time, to which it relates, in an enhanced resource indicator field.

Thus the following description will be focused on how to indicate with an enhanced resource indicator field.

An optional scheme is to use an enhanced resource indicator field including a flag, a carrier indicator field and a sub-frame indicator field, where the flag is of 2 bits.

The 2-bit flag takes 4 values to indicate four cases of "non-cross-time scheduling and non-cross-frequency scheduling", "cross-time scheduling and non-cross-frequency scheduling", "non-cross-time scheduling and cross-frequency scheduling" and "cross-time scheduling and cross-frequency scheduling" respectively.

In the case of "cross-time scheduling and cross-frequency scheduling", the enhanced resource indicator field can subsequently include the carrier indicator field and the sub-frame indicator field. The carrier indicator field can include 5 bits to indicate five carriers to be aggregated, for example, and the sub-frame indicator field can include 10 bits to indicate 10 sub-frames to be aggregated, for example, as depicted in Table 3 below.

TABLE 3

| Flag | frequency-domain eCIF | time-domain eCIF |
|------|----------------------|------------------|
| 11   | 10101                | 1111100011       |

In the case of "non-cross-time scheduling and cross-frequency scheduling", the enhanced resource indicator field can subsequently include only the carrier indicator field. The carrier indicator field can include 5 bits to indicate five carriers to be aggregated, for example, as depicted in Table 4 below.

TABLE 4

| Flag | frequency-domain eCIF |
|------|----------------------|
| 01   | 10101                |

Similarly, in the case of "cross-time scheduling and non-cross-frequency scheduling", the enhanced resource indicator field can subsequently include only the sub-frame indicator field. The sub-frame indicator field can include 10 bits to indicate 10 sub-frames to be aggregated, for example, as depicted in Table 5 below.

TABLE 5

| Flag | time-domain eCIF |
|------|------------------|
| 10   | 1111100011       |

In the case of "non-cross-time scheduling and non-cross-frequency scheduling", there is no scheduling between communication resources, so control information is related to only a communication resource over which the control information is sent, and there is no need to indicate to which communication resource or resources the control information relates in the resource indictor field.

Another optional scheme is to use an enhanced resource indicator field including a flag, a carrier indicator field and a sub-frame indicator field, where the flag is of 1 bit The flag indicates whether there is cross-time scheduling. If there is cross-time scheduling, then the enhanced resource indicator field can subsequently include the carrier indicator field and the sub-frame indicator field, as depicted in Table 6 below. If there is no cross-time scheduling, then the enhanced resource indicator field can subsequently include only the carrier indicator field, as depicted in Table 7 below.

TABLE 6

| Flag | Frequency-domain eCIF | Time-domain eCIF |
|------|----------------------|------------------|
| 1    | 10101                | 1111100011       |

TABLE 7

| Flag | Frequency-domain eCIF |
|------|----------------------|
| 0    | 10101                |

Moreover the length-variable enhanced resource indicator field including the flag may not be adopted, and instead the resource indicator field can be set to fixedly include the carrier indicator field and the sub-frame indicator field without setting the flag, as depicted in Table 8 below.

TABLE 8

| Frequency-domain eCIF | Time-domain eCIF |
|----------------------|------------------|
| 10101                | 1111100011       |

Those ordinarily skilled in the art shall appreciate that the enhanced resource indicator field can be set otherwise so long as it can indicate a correspondence relationship between control information and a communication resource or resource to which it relates.

Alike, with the communication apparatus, communication system and method according to the third embodiment of the present disclosure, communication performance can be improved.

4. A Fourth Embodiment of the Present Disclosure (Hardware Configuration for Implementation of the Embodiments of the Present Disclosure)

According to the fourth embodiment, the communication apparatus and communication method according to the first, second or third embodiment of the invention can be configured in software, firmware, hardware or any combination thereof. In the case of being embodied in software or firmware, programs constituting the software or firmware can be installed from a storage medium or a network to a machine with a dedicated hardware structure (e.g., a general-purpose machine 900 illustrated in FIG. 9), and the machine can perform the various functions of the foregoing respective component units and sub-units when installed with the various programs.

Figure 9:
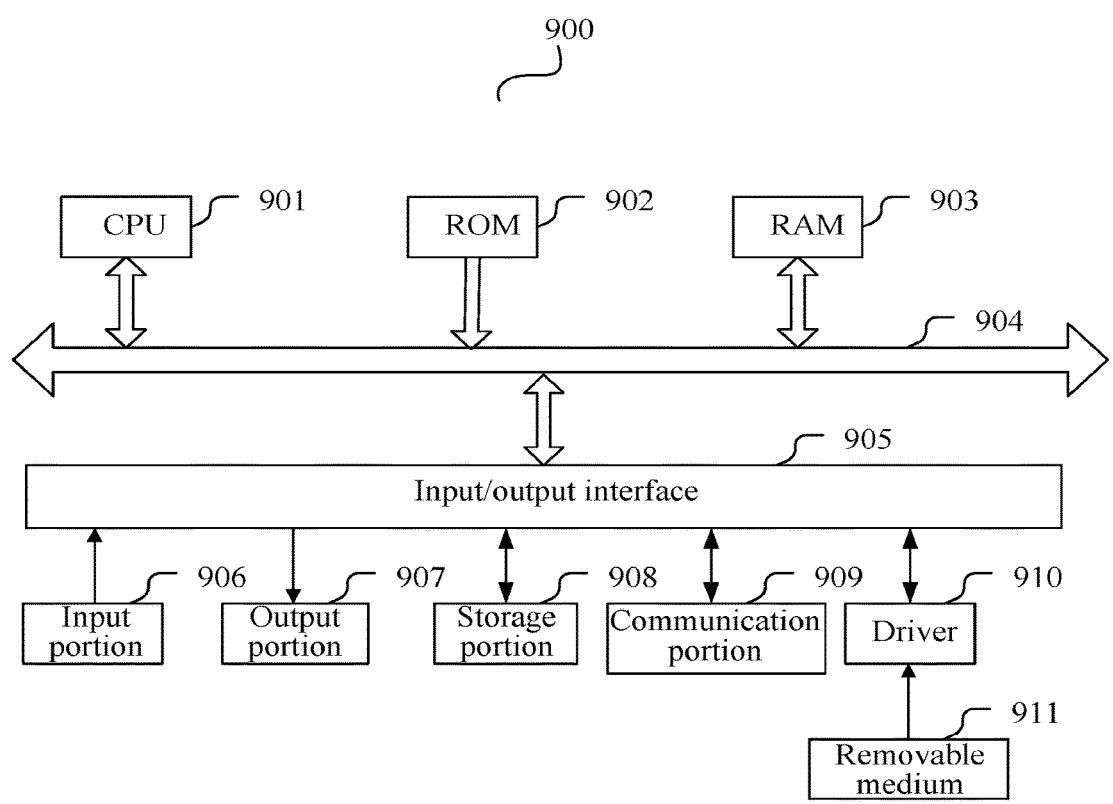
FIG. 9 is a block diagram illustrating hardware configuration according to a fourth embodiment of the present disclosure.
Figure 10:
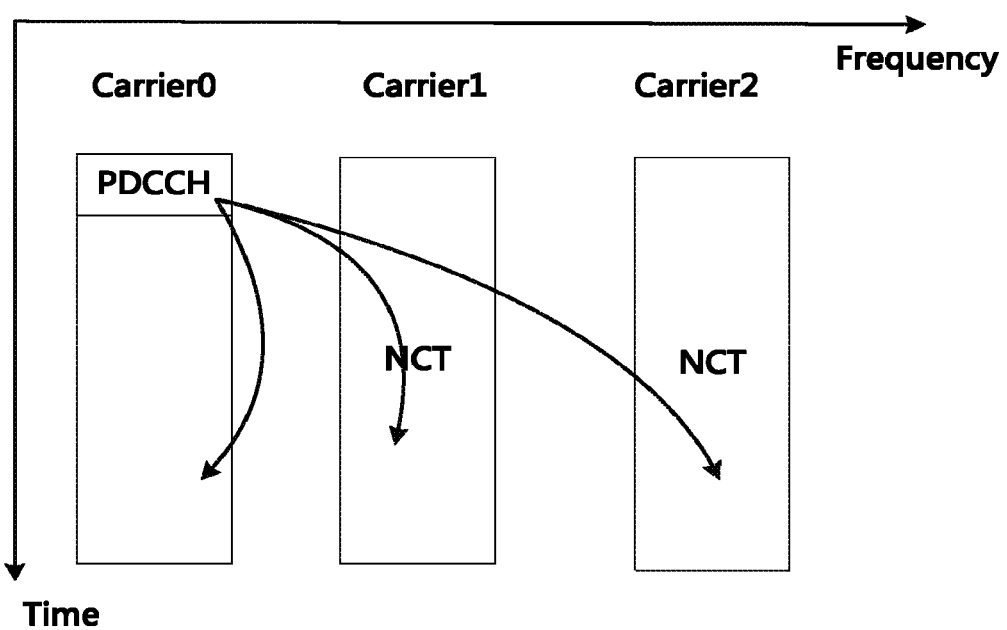
FIG. 10 is a schematic diagram of cross-carrier scheduling.

In FIG. 9, a Central Processing Unit (CPU) 901 performs various processes according to programs stored in a Read Only Memory (ROM) 902 or loaded from a storage portion 908 into a Random Access Memory (RAM) 903. In RAM 903, data required when the CPU 901 performs the various processes, etc., are also stored as needed. The CPU 901, the ROM 902 and the RAM 903 are connected to each other via a bus 904 to which an input/output interface 905 is also connected.

The following components are also connected to the input/output interface 905: an input portion 906 (including a keyboard, a mouse, etc.), an output portion 907 (including a display, e.g., a Cathode Ray Tube (CRT), a Liquid Crystal Display (LCD), etc., and a speaker, etc.), a storage port 908 (including a hard disk, etc.), and a communication portion 909 (including a network interface card, e.g., a Local Area Network (LAN) card, a modem, etc). The communication portion 909 performs a communication process over a network, e.g., the Internet. A driver 910 can also be connected to the input/output interface 905 as needed. A removable medium 911, e.g., a magnetic disk, an optical disk, an optic-magnetic disk, a semiconductor memory, etc., can be installed on the driver 910 as needed so that computer programs fetched therefrom can be installed into the storage portion 908 as needed.

In the case that the foregoing series of processes are performed in software, programs constituting the software can be installed from a network, e.g., the Internet, etc., or a storage medium, e.g., the removable medium 911, etc.

Those skilled in the art shall appreciate that such a storage medium will not be limited to the removable medium 911 illustrated in FIG. 9 in which the programs are stored and which is distributed separately from the apparatus to provide a user with the programs. Examples of the removable medium 911 include a magnetic disk (including a Floppy Disk), an optical disk (including Compact Disk-Read Only memory (CD-ROM) and a Digital Versatile Disk (DVD)), an optic-magnetic disk (including a Mini Disk (MD)) and a semiconductor memory. Alternatively the storage medium can be the ROM 902, a hard disk included in the storage port 908, etc., in which the programs are stored and which is distributed together with the apparatus including the same to the user.

Moreover the present disclosure further proposes a program product with machine readable instruction codes stored thereon. The instruction codes upon being read and executed by a machine can perform the processing method above according to the embodiment of the invention. Correspondingly, various storage mediums for carrying the program product, e.g., a magnetic disk, an optical disk, an optic-magnetic disk, a semiconductor memory, etc. will also come into the scope of the invention.

Moreover the respective operation processes of the processing method according to the embodiment of the invention can also be embodied as computer executable programs stored in various machine readable storage mediums.

The foregoing description is illustrative of the preferred embodiments of the present disclosure. However the foregoing description is merely illustrative but not to limit the present disclosure. Those ordinarily skilled in the art can make modifications, substitutions, combinations and partial combinations to the various features in the embodiments of the present disclosure without departing from the scope of the present disclosure. The scope of the present disclosure shall be as defined in the appended claims.

The invention claimed is:

1. A communication apparatus comprising:
  circuitry configured to
    aggregate, at a base station side, communication resources at different frequencies and different transmission times, wherein a scheduling resource among the aggregated communication resources is used for transmitting at least one piece of control information about the scheduling resource and scheduled resources;
    divide the communication resources into groups of communication resources based on characteristics of the communication resources; and
    configure one of the at least one piece of control information for one or more of the scheduled resources within one of the groups of communication resources, the one of the at least one piece of control information comprising an indicator configurable to indicate any one combination out of all possible combinations of each of the communication resources in the one of the groups of communication resources, and including a plurality of bits, each bit separately identifying whether a corresponding one of the communication resources is included in the one of the groups of communication resources; and
  a communication interface configured to send the one of the at least one piece of control information to a corresponding communication terminal side via the scheduling resource.

2. The communication apparatus according to claim 1, wherein:
  the scheduled resources are carriers of a New Carrier Type.

3. The communication apparatus according to claim 1, wherein:
  the communication resources include sub-frames with different transmission times.

4. The communication apparatus according to claim 1, wherein:
  the indicator corresponds to an enhanced resource indicator field of the one of the at least one piece of control information.

5. The communication apparatus according to claim 4, wherein:
  the length of the enhanced resource indicator field is predetermined or related to a number of communication resources of the one of the groups of communication resources to which the one of the at least one piece of control information is applicable.

6. The communication apparatus according to claim 1, wherein:
  the indicator corresponds to a redundant codeword in a resource indicator field of the one of the at least one piece of control information.

7. The communication apparatus according to claim 1, wherein:
  the characteristics of the communication resources are Channel Quality Indicators (CQIs) between the base station side and the corresponding communication terminal side, provided by the respective communication resources.

8. The communication apparatus according to claim 7, wherein:
- a first set of the communication resources, of which the values of the CQIs range from 1 to 6, are attributed to a first group,
- a second set of the communication resources, of which the values of the CQIs range from 7 to 9, are attributed to a second group, and
- a third set of the communication resources, of which the values of the CQIs range from 10 to 15, are attributed to a third group.

9. The communication apparatus according to claim 1, wherein the one of the at least one piece of control information further comprises time information indicative of the one or more of the scheduled resources.

10. The communication apparatus according to claim 1, wherein
- the circuitry is configured to select a scheme for the indicator; and
- the communication interface is configured to notify the corresponding communication terminal side the selected scheme for the indicator.

11. The communication apparatus according to claim 9, wherein:
- the communication resources include sub-frames at different transmission times.

12. The communication apparatus according to claim 11, wherein:
- the scheduled resource are carriers of a New Carrier Type.

13. The communication apparatus according to claim 11, wherein:
- the communication resources include sub-frames at different transmission times.

14. The communication apparatus according to claim 11, wherein:
- the indicator corresponds to an enhanced resource indicator field of the one of the at least one piece of control information.

15. The communication apparatus according to claim 14, wherein:
- the length of the enhanced resource indicator field is predetermined or related to a number of the communication resources of the one of the groups of communication resources to which the one of the at least one piece of control information is applicable.

16. The communication apparatus according to claim 11, wherein:
- the indicator corresponds to a redundant codeword in a resource indicator field of the one of the at least one piece of control information.

17. The communication apparatus according to claim 11, wherein:
- the characteristics of the communication resources are Channel Quality Indicators (CQIs) between the communication terminal side and the corresponding base station side, provided by the respective communication resources.

18. A communication method comprising:
- aggregating, at a base station side, communication resources at different frequencies and different transmission times, wherein a scheduling resource among the aggregated communication resources is used for transmitting at least one piece of control information about the scheduling resource and scheduled resources;
- configuring one of the at least one piece of control information for one or more of the scheduled resources within a group of communication resources among the aggregated communication resources, the one of the at least one piece of control information comprising an indicator configurable to indicate any one combination out of all possible combinations of each of the communication resources, and including a plurality of bits, each bit separately identifying whether a corresponding one of the communication resources is included in the group of communication resources; and
- sending the one of the at least one piece of control information to a corresponding communication terminal via the scheduling resource.

19. A communication method comprising:
- aggregating, at a communication terminal side, communication resources at different frequencies and different transmission times, wherein a scheduling resource among the aggregated communication resources is used for transmitting at least one piece of control information about the scheduling resource and scheduled resources;
- providing characteristics of the communication resources to a base station; and
- receiving one of the at least one piece of control information via the scheduling resource and processing the communication resources based on one of the at least one piece of control information, the communication resources being divided into groups based on the characteristics of the communication resources, the one of the at least one piece of control information being configured for one or more of the scheduled resources within one of the groups of communication resources, the one of the at least one piece of control information comprising an indicator configurable to indicate any one combination out of all possible combinations of each of the communication resources in the one of the groups of communication resources, and including a plurality of bits, each bit separately identifying whether a corresponding one of the communication resources is included in the one of the groups of communication resources.

20. The communication method according to claim 18, wherein the one of the at least one piece of control information further comprises time information indicative of the one or more of the scheduled resources.

* * * * *